(12) United States Patent
Newman et al.

(10) Patent No.: US 12,294,967 B2
(45) Date of Patent: May 6, 2025

(54) PHASE-SHIFT GUARD-SPACE TIMESTAMP POINT FOR 5G/6G SYNCHRONIZATION

(71) Applicants: David E. Newman, Poway, CA (US); R. Kemp Massengill, Palos Verdes, CA (US)

(72) Inventors: David E. Newman, Poway, CA (US); R. Kemp Massengill, Palos Verdes, CA (US)

( * ) Notice: Subject to any disclaimer, the term of this patent is extended or adjusted under 35 U.S.C. 154(b) by 188 days.

(21) Appl. No.: 18/199,524

(22) Filed: May 19, 2023

(65) Prior Publication Data

US 2024/0196354 A1  Jun. 13, 2024

Related U.S. Application Data

(63) Continuation of application No. 18/096,052, filed on Jan. 12, 2023, now Pat. No. 11,722,980.

(Continued)

(51) Int. Cl.
*H04W 56/00* (2009.01)
*H04J 3/06* (2006.01)
(Continued)

(52) U.S. Cl.
CPC ......... *H04W 56/005* (2013.01); *H04J 3/0661* (2013.01); *H04J 3/0667* (2013.01); *H04J 11/00* (2013.01); *H04L 7/0037* (2013.01); *H04L 7/007* (2013.01); *H04L 27/2601* (2013.01); *H04W 56/003* (2013.01); *H04W 56/0055* (2013.01); *H04W 56/0075* (2013.01); *H04J 2011/0013* (2013.01); *H04J 2011/0096* (2013.01)

(58) Field of Classification Search
CPC ............ H04W 56/005; H04W 56/003; H04W 56/0055; H04W 56/0075; H04W 56/0015; H04W 56/0035; H04W 56/0045; H04J 3/0661; H04J 3/0667; H04J 11/00; H04J 2011/0013; H04J 2011/0096; H04L 7/0037; H04L 7/007; H04L 27/2601; H04L 5/0053; H04L 5/0094; H04L 27/261; H04L 27/2662; H04L 27/2675; H04L 27/2692
See application file for complete search history.

(56) References Cited

U.S. PATENT DOCUMENTS 6,058,101 A * 5/2000 Huang ................ H04L 27/2659
370/208
7,649,912 B2  1/2010  Balasubramanian
(Continued)

*Primary Examiner* — Nizam U Ahmed

(57) ABSTRACT

A base station can cause a multitude of user devices in a network to be synchronized with the base station's clock using an ultra-lean low-complexity procedure in 5G or 6G. On a predetermined interval, the base station can transmit a timing signal in the guard-space of a predetermined resource element. The timing signal is a 180-degree phase reversal of the cyclic prefix centered in the guard-space. Each user device can receive the timing signal, determine how far the received timestamp point is from the middle of the guard-space (as viewed by the user device), and thereby determine a timing error between the user device clock and the base station clock, and correct the user device clock accordingly. In addition, the user device can average the timing adjustments over a number of instances, thereby determining a frequency offset if the average differs significantly from zero, and thereby adjust the clock frequency.

20 Claims, 9 Drawing Sheets

Related U.S. Application Data

(60) Provisional application No. 63/437,839, filed on Jan. 9, 2023, provisional application No. 63/435,061, filed on Dec. 23, 2022, provisional application No. 63/476,032, filed on Dec. 19, 2022, provisional application No. 63/431,810, filed on Dec. 12, 2022.

(51) Int. Cl.
*H04J 11/00* (2006.01)
*H04L 7/00* (2006.01)
*H04L 27/26* (2006.01)

(56) References Cited

U.S. PATENT DOCUMENTS

| | | |
|---|---|---|
| 7,991,362 B2 | 8/2011 | Lane |
| 10,375,659 B1 | 8/2019 | Ramlall |
| 10,868,664 B2 * | 12/2020 | Goldin .................. H04L 7/08 |
| 2008/0186906 A1 | 8/2008 | Defrance |
| 2010/0097153 A1 * | 4/2010 | Rexberg ............ H04L 25/4902 |
| | | 332/109 |
| 2011/0216816 A1 | 9/2011 | Frenzel |
| 2014/0068315 A1 | 3/2014 | Aweya |
| 2014/0133599 A1 * | 5/2014 | Ouchi ................ H04B 7/0469 |
| | | 375/295 |
| 2018/0145780 A1 | 5/2018 | Zhao |
| 2019/0037411 A1 * | 1/2019 | Wu ...................... H04W 16/14 |
| 2019/0326916 A1 | 10/2019 | Parra Vilchis |
| 2020/0351189 A1 | 11/2020 | Horn |
| 2021/0058207 A1 * | 2/2021 | Lee ..................... H04L 5/0044 |
| 2021/0159995 A1 | 5/2021 | Zhang |
| 2022/0123849 A1 | 4/2022 | McCall |
| 2022/0417935 A1 * | 12/2022 | Sakhnini ............ H04W 72/23 |

\* cited by examiner

FIG. 2C

> 221 - Base station: Transmit a subframe with a timestamp point embedded in the first guard-space of the first OFDM symbol. The timestamp point is an abrupt change in the phase, amplitude, or branch of the signal, centered in the guard-space.

↓

> 222 - User device: Receive the OFDM symbol containing the guard-space timestamp point. Compare the guard-space timing signal to the corresponding final-portion signal of the OFDM symbol.

↓

> 223 - Based on the comparing, determine a precise time of the timestamp point by detering an abrupt modulation change in the guard-space timing signal.

↓

> 224 - Measure a timing error equal to a time difference between the timestamp point and the center of the guard-space, as determined by receiver clock.

↓

> 225 - Adjust the receiver clock time according to the timing error.

FIG. 2D

> 231 - Base station: Periodically transmit a guard-space timing resource element at a predetermined subcarrier and symbol-time in the resource grid. Indicate periodicity in system information files.

↓

> 232 - User device: Receive two sequential guard-space timing resource elements. Determine two timestamp points and measure the interval between them, according to user device's clock.

↓

> 233 - Compare the measured interval to the expected interval according to the periodicity specified in system information files or elsewhere.

↓

> 234 - Determine a frequency offset between base station clock rate and user device clock rate.

↓

> 235 - Adjust the receiver clock rate according to the frequency offset.

PHASE-SHIFT GUARD-SPACE TIMESTAMP POINT FOR 5G/6G SYNCHRONIZATION

PRIORITY CLAIMS AND RELATED APPLICATIONS

This application is a continuation of U.S. patent application Ser. No. 18/096,052, entitled "Guard-Space Timestamp Point for Precision Synchronization in 5G and 6G", filed Jan. 12, 2023, which claims the benefit of U.S. Provisional Patent Application Ser. No. 63/431,810, entitled "Mid-Symbol Timestamp Point for Precision Synchronization in 5G and 6G", filed Dec. 12, 2022, and U.S. Provisional Patent Application Ser. No. 63/476,032, entitled "Guard-Space Timestamp Point for Precision Synchronization in 5G and 6G", filed Dec. 19, 2022, and U.S. Provisional Patent Application Ser. No. 63/435,061, entitled "Compact Timing Signal for Low-Complexity 5G/6G Synchronization", filed Dec. 23, 2022, and U.S. Provisional Patent Application Ser. No. 63/437,839, entitled "Ultra-Lean Synchronization Procedure for 5G and 6G Networking", filed Jan. 9, 2023, all of which are hereby incorporated by reference in their entireties.

FIELD OF THE INVENTION

The disclosure pertains to synchronization of clocks using a wireless message that contains a timestamp point.

BACKGROUND OF THE INVENTION

Wireless messages depend on tightly controlled timing, so that modulated signals will be received at the expected time with the correct frequency. Distributing the timing information by cable is no longer feasible, as many users are mobile or at least portable; hence the time synchronization and clock rate are generally distributed in wireless messages. Due to the very high frequencies planned for in 5G and 6G, improved means are needed to enable user devices to synchronize their timing and frequency precisely, without excessive messaging and overhead.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY OF THE INVENTION

In a first aspect, there is a method for a base station of a wireless network to provide synchronization signals, the method comprising: transmitting a signal occupying a single symbol-time of a resource grid, the signal comprising a first guard-space portion followed by a second guard-space portion followed by a message portion; wherein the message portion comprises a final region at an ending of the symbol-time, and a pre-final region immediately preceding the final region; wherein the second guard-space portion is a copy of the signal in a final region of the message portion; and wherein the first guard-space portion comprises a phase-shifted copy of the signal in the pre-final region of the message portion.

In another aspect, there is a method for a user device of a wireless network to receive synchronization signals, the method comprising: receiving a signal occupying a single symbol-time of a resource grid, the signal comprising a first guard-space portion followed by a second guard-space portion followed by a message portion; wherein the message portion comprises a final region at an ending of the symbol-time, and a pre-final region immediately preceding the final region; comparing the signal in the second guard-space portion to the signal in the final region of the message portion; comparing the signal in the first guard-space portion to the signal in the pre-final region, phase-shifted according to a predetermined phase shift; determining, according to the comparing, a timestamp time corresponding to a boundary between the first guard-space portion and the second guard-space portion; and adjusting a clock setting of the user device according to the timestamp time.

In another aspect, there is a method for a user device, of a wireless network comprising a base station, to adjust a clock frequency, the method comprising: periodically receiving a guard-space timestamp point comprising a 180 degree phase reversal of a signal in a guard-space of a predetermined resource element; upon receiving each timestamp point, determining a timing correction according to a time difference comprising a time of the timestamp point minus a time of a midpoint of the guard-space, and applying a time correction to a clock of the user device according to the time difference; after receiving at least integer N timestamp points, determining an average of N time differences; calculating a frequency offset comprising the average of N time differences, times a frequency of the clock of the user device, divided by an interval between the timestamp points; and adjusting the frequency of the clock of the user device according to the frequency offset.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

These and other embodiments are described in further detail with reference to the figures and accompanying detailed description as provided below.

BRIEF DESCRIPTION OF THE DRAWINGS

FIG. 2C is a flowchart showing an exemplary embodiment of an analysis procedure to synchronize a user device with a base station, according to some embodiments.

FIG. 2D is a flowchart showing an exemplary embodiment of an analysis procedure to correct a user device clock rate, according to some embodiments.

Like reference numerals refer to like elements throughout.

DETAILED DESCRIPTION

Figure 1A:
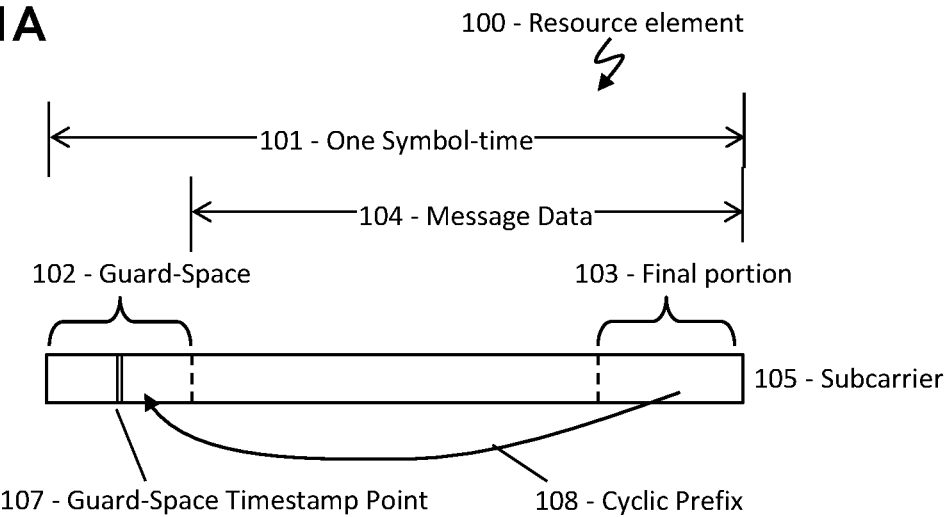
FIG. 1A is a schematic showing an exemplary embodiment of a symbol-time in a single resource element with a guard-space timestamp point, according to some embodiments.

Systems and methods disclosed herein (the "systems" and "methods", also occasionally termed "embodiments" or "arrangements" or "versions" or "examples", generally according to present principles) can provide urgently needed wireless communication protocols for precisely synchronizing clocks using wireless messages that provide an explicit timestamp point that a receiver can measure. Improved precision timing will be required for reliable communication at the high frequencies planned for 5G and 6G. An explicit guard-space timestamp point, disclosed herein, may be configured to enable rapid precision time and frequency adjustment, according to some embodiments.

A "guard-space" is an initial short region of each message element before the beginning of the message data. For convenient signal processing, the guard-space is generally filled with a "cyclic prefix", which is simply a duplication of the final region of the message data. In examples below, the cyclic prefix may be modified by an amplitude spike or other feature, which demarks a specific timestamp point that the receiver can use for precision clock synchronization. The timestamp point may be added to the cyclic prefix of a particular resource element at a particular subcarrier frequency, or the timestamp point may be imposed on the guard-space signal of a composite OFDM symbol that accumulates multiple subcarrier signals together. If the timestamp point is imposed on the OFDM symbol, the receiver can compare the OFDM guard-space with the OFDM final-portion signal to discern the timestamp point. If the timestamp point is imposed on a single subcarrier's guard-space, the receiver can separate that subcarrier signal from the received OFDM symbol and compare the subcarrier guard-space to the subcarrier final-portion signal to localize the timestamp point. In either case, the receiver can obtain a precise time mark according to the time of the timestamp point relative to the guard-space boundaries.

The guard-space timestamp point is a detectable pattern or change in the modulation of a "synchronization waveform" or "timing signal" in the guard-space. The guard-space timestamp point may be positioned at a particular time, such as the center of the guard-space of a particular subcarrier signal or a composite OFDM symbol, according to some embodiments. For example, the modulation pattern may be a sudden phase or amplitude reversal, or a detectable increase or decrease in the signal amplitude, or a sudden interchange between I and Q quadrature branch signals, or other abrupt signal change that a receiver can precisely detect within the guard-space of a timing resource element. The guard-space timestamp point may be centrally positioned in the modulation pattern, and the modulation pattern may be centrally positioned in the guard-space, as determined by the transmitter's clock. The receiver can then measure the time of the timestamp point relative to the start or end of the guard-space, as determined by the receiver's clock. The time of arrival of the timestamp point is determined by the transmitter, whereas the time of the symbol boundary is determined by the receiver's clock. Therefore, by measuring the time of the timestamp point relative to the symbol boundaries, the receiver can detect a disagreement between the transmitter's clock and the receiver's clock. In addition, a base station can transmit timing signals on a predetermined schedule or periodicity, and the user devices can measure a time interval between successive timestamp points. The receiver can then correct its clock rate according to any difference between the measured interval and the periodicity, thereby maintaining the receiver's clock rate in accordance with the transmitter's clock rate, as well as the clock time.

In some embodiments, the receiver can set its clock so that the received time of the timestamp point equals the scheduled transmission time of the timestamp point, as indicated in system information files, or the like. In that case, the transmitter and receiver clocks differ by the one-way signal propagation time (plus electronic delays in amplifiers, etc.). The receiver can then transmit uplink messages by applying a timing advance equal to the round-trip propagation time, thereby causing the uplink messages to arrive at the base station synchronized with the base station's resource grid.

In other embodiments, the receiver can determine the propagation time in advance. Then upon receiving each timestamp point, the receiver can set the receiver's clock equal to the scheduled transmission time of that timestamp point, plus the one-way propagation time. The uplink messages can then be transmitted with a timing advance of one propagation time. By either method, the user device can cause the uplink messages to arrive at the base station synchronized with the base station's resource grid, as desired.

In prior art, guard-space signal is generally a duplicate of a final-portion signal of the message data, as mentioned. Although redundant, the cyclic prefix can minimize inter-symbol interference, ensure orthogonality, and accommodate a wide range of propagation times. The guard-space timestamp point disclosed herein changes the guard-space signal, which then differs from the final-portion signal. Nevertheless, as explained below, the modified cyclic prefix is expected to provide substantially the same services as the prior-art cyclic prefix, while also providing a precision timestamp point.

Processes detailed below show how the receiver can precisely localize the timestamp point to a particular time within the guard-space. For example, the receiver can compare the cyclic prefix waveform to the final-portion signal, and can thereby determine the time of the phase or amplitude change. The timing of the receiver's resource grid is determined by the receiver's clock, but the timing signal itself, including the timestamp point, is determined by the transmitter's clock. Therefore, any disagreement between the transmitter and receiver clocks would cause the timestamp point to deviate from the expected time within the guard-space, which would indicate a clock time error equal to that deviation amount.

Clock time errors are generally due to clock drift in the receiver. If the receiver finds that the timestamp point is centered in the receiver's guard-space interval, the receiver can conclude that the receiver's clock is still synchronized with the transmitter's clock. If the receiver detects a time deviation between the timestamp point and the center of the guard-space, this indicates that the receiver's clock has drifted by the deviation amount. The receiver can then reset its clock time to agree with the transmitter, and thereby regain synchronization. By this method, all of the user devices in a network can simultaneously synchronize with the base station, without exchanging unnecessary messages and without consuming any resource elements (since the timing signal is contained in a guard-space, outside the message data region).

In some cases, the receiver's clock rate or frequency may have drifted, as well as its clock time. The transmitter can assist the receiver by providing two guard-space timestamp points, which are separated in time by a predetermined interval. For example, the base station can transmit guard-space timestamp points periodically, or upon another predetermined schedule, which may be specified in system information files. The receiver can then measure the time interval between the two guard-space timestamp points using its own (the receiver's) clock. The receiver can then compare the interval measurement to the expected interval according to the periodicity or schedule, and can thereby determine a frequency mismatch between the base station's clock rate and the user device's clock rate. By measuring the time between successive guard-space timestamp points, the receiver can measure the total clock rate deviation (including the Doppler shift, if mobile). The receiver can then adjust its clock rate to negate that mismatch. Thus the receiver has synchronized its clock setting with the base station's clock, and has adjusted its clock rate in agreement with the base station's clock rate, without exchanging unnecessary messages such as legacy synchronization messages between the transmitter and receiver.

The examples presented below are suitable for adoption by a wireless standards organization. Providing a compact, precision timestamp point within a guard-space, and the associated ultra-lean procedures for time/frequency alignment, may enable user devices to rapidly synchronize to the base station, and may thereby optimize communication reliability at high frequencies, without exchanging unnecessary messages.

Terms herein generally follow 3GPP (third generation partnership project) standards, but with clarification where needed to resolve ambiguities. As used herein, "5G" represents fifth-generation, and "6G" sixth-generation, wireless technology in which a network (or cell or LAN Local Area Network or RAN Radio Access Network or the like) may include a base station (or gNB or generation-node-B or eNB or evolution-node-B or AP Access Point) in signal communication with a plurality of user devices (or UE or User Equipment or user nodes or terminals or wireless transmit-receive units) and operationally connected to a core network (CN) which handles non-radio tasks, such as administration, and is usually connected to a larger network such as the Internet. The time-frequency space is generally configured as a "resource grid" including a number of "resource elements", each resource element being a specific unit of time termed a "symbol period" or "symbol-time", and a specific frequency and bandwidth termed a "subcarrier" (or "subchannel" in some references). Symbol periods may be termed "OFDM symbols" (Orthogonal Frequency-Division Multiplexing) in which the individual signals of multiple subcarriers are added in superposition. The time domain may be divided into ten-millisecond frames, one-millisecond subframes, and some number of slots, each slot including 14 symbol periods. The number of slots per subframe ranges from 1 to 8 depending on the "numerology" selected. The frequency axis is divided into "resource blocks" (also termed "resource element groups" or "REG" or "channels" in references) including 12 subcarriers, each subcarrier at a slightly different frequency. The "numerology" of a resource grid corresponds to the subcarrier spacing in the frequency domain. Subcarrier spacings of 15, 30, 60, 120, and 240 kHz are defined in various numerologies. Each subcarrier can be independently modulated to convey message information. Thus a resource element, spanning a single symbol period in time and a single subcarrier in frequency, is the smallest unit of a message. "Classical" amplitude-phase modulation refers to message elements modulated in both amplitude and phase, whereas QAM "quadrature amplitude modulation" or "PAM" (pulse-amplitude modulation) includes two signals, separately amplitude-modulated, and then multiplexed and transmitted with a 90-degree phase shift between them. The two signals may be called the "I" and "Q" branch signals (for In-phase and Quadrature-phase) or "real and imaginary" among others. Standard modulation schemes in 5G and 6G include BPSK (binary phase-shift keying), QPSK (quad phase-shift keying), 16QAM (quadrature amplitude modulation with 16 modulation states), 64QAM, 256QAM and higher orders. Most of the examples below relate to QPSK or 16QAM, with straightforward extension to the other levels of modulation. QPSK is phase modulated but not amplitude modulated. 16QAM may be modulated according to PAM which exhibits two phase levels at zero and 90 degrees (or in practice, for carrier suppression, +45 degrees) and four amplitude levels including two positive and two negative amplitude levels, thus forming 16 distinct modulation states. For comparison, classical amplitude-phase modulation with 16 states includes four positive amplitude levels and four phases of the overall wave signal, which are multiplexed to produce the 16 states of the modulation scheme. "SNR" (signal-to-noise ratio) and "SINR" (signal-to-interference-and-noise ratio) are used interchangeably unless specifically indicated. "RRC" (radio resource control) is a control-type message from a base station to a user device. "Digitization" refers to repeatedly measuring a waveform using, for example, a fast ADC (analog-to-digital converter) or the like. An "RF mixer" is a device for multiplying an incoming signal with a local oscillator signal, thereby selecting one component of the incoming signal. "DFT" (discrete Fourier transformation) is a mathematical operation.

In addition to the 3GPP terms, the following terms are defined. As used herein, a "timing symbol" is an OFDM symbol that includes an explicit timestamp point. An "explicit timestamp point" is a sudden modulation change in a "timing signal" or "synchronization waveform" in a timing symbol. A "guard-space timestamp point" is an abrupt change in a wireless signal at or near the midpoint (or other predetermined location) of the guard-space of a particular subcarrier or of a composite OFDM symbol. A receiver can detect the guard-space timestamp point, for example by comparing the timing signal in the guard-space with the final-portion signal of the symbol-time. Since the guard-space signal includes the timestamp point while the final-portion does not, the receiver can thereby determine the time of the timestamp point relative to a receiver's clock. Then, if the time of the timestamp point differs from the expected time (as specified in the periodicity or schedule), the receiver can adjust its clock time accordingly, and thereby synchronize with the base station. "Synchronization" means adjusting a clock setting to match another clock's time. "Syntonization" means adjusting a clock frequency to match another clock's frequency.

Although in references a modulated resource element of a message may be referred to as a "symbol", this may be confused with the same term for a time interval ("symbol-time"), or a composite waveform ("OFDM symbol"), among other things. Therefore, each modulated resource element of a message is referred to as a "modulated message resource element", or more simply as a "message element", in examples below. "RF" or radio-frequency refers to electromagnetic waves in the MHz (megahertz) or GHz (gigahertz) frequency ranges. "Phase noise" is random noise or time jitter that alters the overall phase of a received signal, usually without significantly affecting the overall amplitude. "Phase-noise tolerance" is a measure of how much phase alteration can be imposed on a message element without causing a demodulation fault. "Amplitude noise" includes any noise or interference that primarily affects amplitudes of received signals. Interference due to competing signals is treated as noise herein, unless otherwise specified. Referring to quadrature or QAM or PAM modulation, an "I-Q" space is an abstract two-dimensional space defined by an I-branch amplitude and an orthogonal Q-branch amplitude, in which each transmitted message element occupies one of several predetermined I-Q states of a modulation scheme. The orthogonal branches are sometimes called "real" and "imaginary", and the I-Q space is sometimes called the "complex plane". The incoming signal to the receiver may be termed the "raw" signal or "overall" waveform, which includes an "overall amplitude" and an "overall phase". The receiver can then process the overall signal by separating it into two orthogonal branches as mentioned. The receiver can also combine the branch amplitudes to determine a "sum-signal", which is the vector sum of the I and Q branch signals and generally approximates the overall waveform. A vector sum is a sum of two vectors, which in this case represent the amplitudes and phases of the two orthogonal branches in I-Q space. The sum-signal has a "sum-signal amplitude", equal to the square root of the sum of the I and Q branch amplitudes squared (the "root-sum-square" of I and Q), and a "sum-signal phase", equal to the arctangent of the ratio of the I and Q signal amplitudes (plus an optional base phase, ignored herein). Thus the sum-signal represents the overall received waveform of a particular subcarrier, aside from signal processing errors in the receiver—which are generally negligible and are ignored herein.

Turning now to the figures, examples show how a precision timestamp point can be configured in a guard-space region.

FIG. 1A is a schematic showing an exemplary embodiment of a symbol-time in a single resource element with a guard-space timestamp point, according to some embodiments. As depicted in this non-limiting example, a single resource element 100 of a resource grid is defined by a symbol-time 101 and a subcarrier 105. The resource element 100 is generally divided into a guard-space 102 followed by message data 104, separated by a dashed line. A receiver can receive a transmitted OFDM symbol that includes the symbol-time 101 shown, extract the subcarrier 105 signal, and decode the message data 104 therein. The receiver generally discards the guard-space 102.

In this example, the guard-space 102 includes a timestamp point 107 which is a specific signal or modulation that a receiver can detect. The receiver can measure the time of the timestamp point 107 relative to the start of the guard-space or the boundaries of the symbol-time 101. The timestamp point 107 is transmitted, by a transmitter, at a transmitted time in the guard-space (such as centered in the guard-space), according to a clock in the transmitter. However, the timestamp point 107 is detected by the receiver at a received time, relative to the receiver's guard-space according to the receiver's clock. If the receiver's clock is synchronized with the base station's clock, the received time of the timestamp point 107 will be the same as the transmitted time of the timestamp point, and the received timestamp point 107 will be centered in the guard-space 102. But if the receiver's clock has drifted relative to the transmitter's clock, then the timestamp point 107 will appear displaced from the center of the receiver's guard-space. The displacement represents a timing error of the receiver's clock, which the receiver can then correct by adjusting its clock time.

Also shown is a final-portion signal 103 of the symbol-time 101. The final-portion signal 103 is the same length as the guard-space 102. The final-portion signal 103 is typically copied into the guard-space as a cyclic prefix 108. The timestamp point 107 in the guard-space 102 is a modification of the final portion 103 of the symbol-time 101, such as an abrupt change in the amplitude or phase modulation, an abrupt interchange between QAM branches, or a predetermined shaped modification or pattern as explained below. The receiver can determine the time of the timestamp point 107, relative to the guard-space 102 boundaries. For example, the receiver can compare the guard-space signal 102 to the final-portion signal 103, or by other methods as explained below. The receiver can then compare the measured time of the timestamp point 107 to a predetermined time (as specified by convention or in a system information file, for example), and thereby determine the timing error, and can then bring its clock into synchronization with the base station's clock.

The cyclic prefix is generally intended to provide inter-subcarrier orthogonality by arranging an integral number of whole wavelengths between adjacent subcarrier signals, inter-symbol isolation by providing a ringdown interval without message data, accommodation for distant users that may have large propagation times, and certain simplifications regarding mathematical operations by the receiver. The modified guard-space that includes a timestamp point may also provide those benefits. For example, the guard-space signal may be tailored to provide orthogonality in the same way as the cyclic prefix. The guard-space timestamp point has no effect on the inter-symbol isolation, as long as the modified guard-space is the same duration as the prior-art guard-space. As for the distant user devices, they can correct for their excessive propagation time by applying a suitable timing advance to their uplink transmissions, and can thereby conform to the base station's clock instead of relying on the cyclic prefix for sloppy timing. The modified guard-space signal may or may not provide the same mathematical simplifications as the prior art (as in DFT precoding), depending on implementation as described below, but such operations are usually not obligatory, and anyway they are not performed on downlink transmissions. Therefore it is believed that the guard-space signal, including the timestamp points disclosed herein, can be configured to provide the same services as the unmodified cyclic prefix, while additionally providing substantial benefits in synchronization.

Multiple user devices in a network can synchronize their clocks with the base station simultaneously by receiving the timestamp point 107 and correcting any timing error determined by each user device. The base station can transmit guard-space timing signals periodically, such as once per frame or subframe or other periodicity, and the user devices can thereby maintain synchronicity and syntonicity with the base station. Importantly, the disclosed method involves no handshaking or messages or other overhead, other than the modification of one guard-space to provide the timestamp point. In addition, no communications are delayed or interrupted by this method because the timestamp point 107 is placed in the guard-space 102, which is generally discarded, instead of the message data 104 portion, which contains the message information. In addition, no significant increase in transmitter power or receiver power is required since the transmitter already transmits the cyclic prefix in the guard-space and the receiver already receives the guard-space of each message element. Hence the base station, by periodically transmitting a timestamp point in the guard-space of a particular resource element or OFDM symbol, can enable all of the user devices of a network to maintain synchronization at substantially zero cost, according to some embodiments.

Figure 1B:
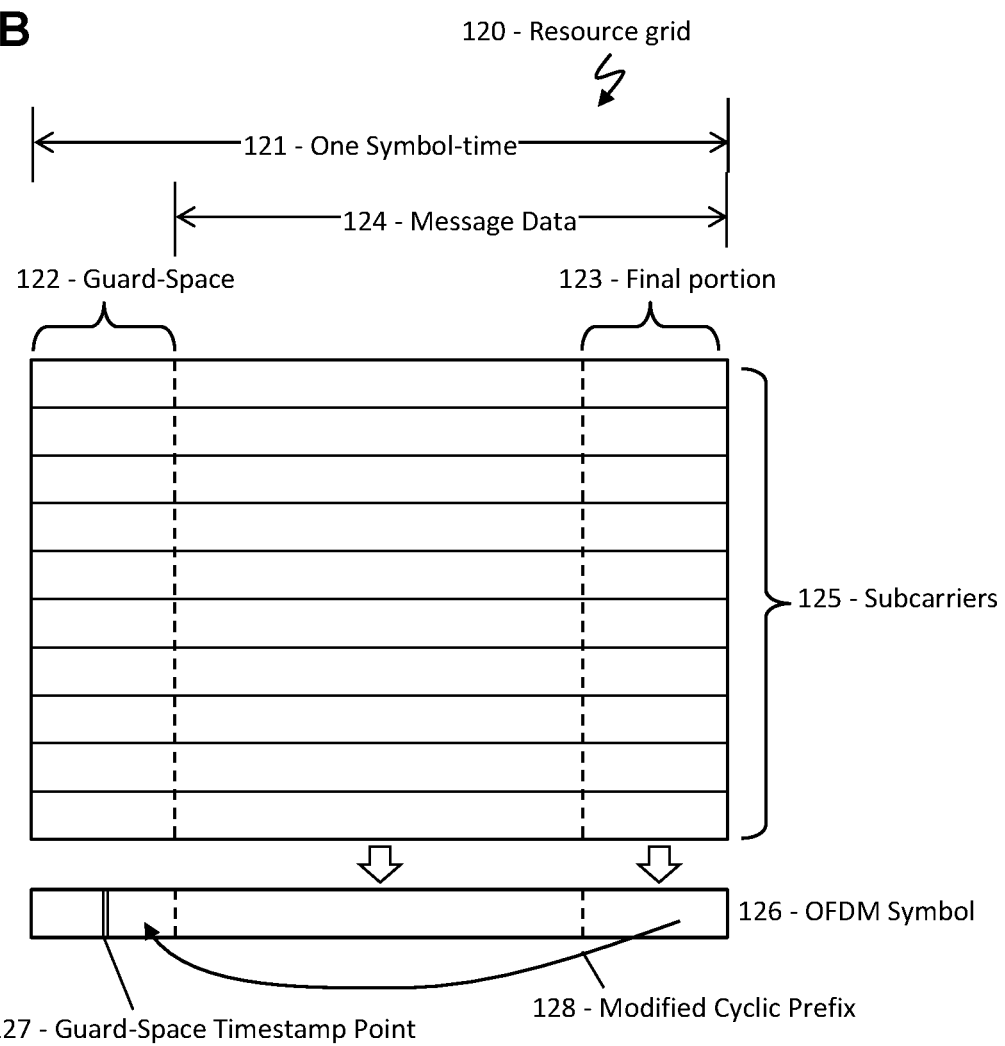
FIG. 1B is a schematic showing an exemplary embodiment of a symbol-time and an OFDM symbol with a guard-space timestamp point, according to some embodiments.

FIG. 1B is a schematic showing an exemplary embodiment of a symbol-time containing an OFDM symbol which includes a guard-space timestamp point, according to some embodiments. As depicted in this non-limiting example, a single symbol-time 121 of a resource grid 120 is shown divided into subcarriers 125. Each subcarrier 125 has a guard-space region 122 followed by a message data portion 124. The message data portion 124 includes a final-portion signal 123 at the end of the symbol-time 121. The final-portion signal 123 is generally copied into the guard-space 122, where it is termed a cyclic prefix in prior art. Dashed lines indicate boundaries between the guard-space region 122, the final-portion signal 123, and the rest of the message data 124.

Also shown is an OFDM symbol 126 in which the message data 124 regions of all the subcarriers 125 are added together, as suggested by fat arrows. In modern networks, the base station generally transmits the OFDM symbol 126 instead of the individual subcarrier 125 signals. The user devices receive the OFDM symbol 126 and separate the subcarrier signals 125 by various signal processing means. The OFDM symbol 126 includes a guard-space 122 temporally preceding the message data 124. The final-portion signal 123 of the OFDM symbol 126 is generally copied into the guard-space 122 of the OFDM symbol 126, as suggested by a curvy arrow 128. In this example, however, the OFDM guard-space is modified by the addition of a guard-space timestamp point 127 (double line). Thus the signal in the OFDM guard space 122 differs from the OFDM final-portion signal 123 by the addition of the guard-space timestamp point 127. Unlike the previous example (in which the timestamp point 107 appears in only one subcarrier signal), in this example the timestamp point is inserted into the composite OFDM symbol 126. Therefore the receiver can measure the timestamp point 127 in the OFDM guard-space without extracting the individual subcarrier signals. This may be advantageous by avoiding the narrowband filtering involved in subcarrier extraction, and therefore the OFDM method may preserve finer features of the timestamp point 127.

The guard-space timestamp point 127 in the OFDM symbol 126 can be used to synchronize the clock of a receiver to the clock of a transmitter. The receiver can detect the guard-space timestamp point 127 by various means. For example, the receiver can compare the signal in the guard-space 122 of the OFDM symbol 126 to the final portion 123 of the OFDM symbol 126, which generally differ only by the addition of the timestamp point 127. The receiver can determine the time of the timestamp point 127 within the guard-space 122. The guard-space 122 boundaries are determined by the receiver's clock, but the timestamp point 127 is determined by the transmitter's clock. Thus any displacement of the timestamp point 127 from the midpoint of the guard-space 122 indicates that the receiver's clock has drifted. The receiver can then correct its clock setting according to the displacement, and thereby synchronize with the transmitter.

The depicted symbol-time 121, including the guard-space timestamp point 127 in the OFDM symbol 126, may be transmitted on a predetermined schedule, such as a periodic schedule, such as the first symbol-time of each frame or each subframe. The timestamp point 127 may be transmitted at a particular time in the OFDM guard-space 122, such as the midpoint of the OFDM guard-space 122. Thus the receiver can determine, from convention or system information files for example, the exact transmitted time of the timestamp point 127 within the guard-space 122 of the OFDM timing symbol 126. The receiver can then measure the received time at which the timestamp point 127 is received, relative to the receiver's guard-space 122 boundaries, and can thereby detect a timing disagreement between the transmitter and receiver. The receiver can then adjust its system clock to correct the disagreement.

Importantly, the synchronization as described involves no unnecessary overhead such as message exchanges. Unlike prior-art synchronization procedures, the depicted example avoids unnecessary messages without loss of performance. In addition, the example provides that normal communications can proceed uninterrupted because the timestamp point 127 is configured in the guard-space region, which is generally not used for message data. Indeed, the message data region is generally unaffected by the presence of the timestamp point 127. Hence the communications remain uninterrupted while the transmitter and receiver perform a precision resynchronization on a prearranged schedule. Unlike legacy synchronization procedures, burdened by unnecessary message exchanges, the disclosed synchronization procedure can be accomplished with zero increase in resource consumption at substantially zero cost, according to some embodiments.

Figure 2A:
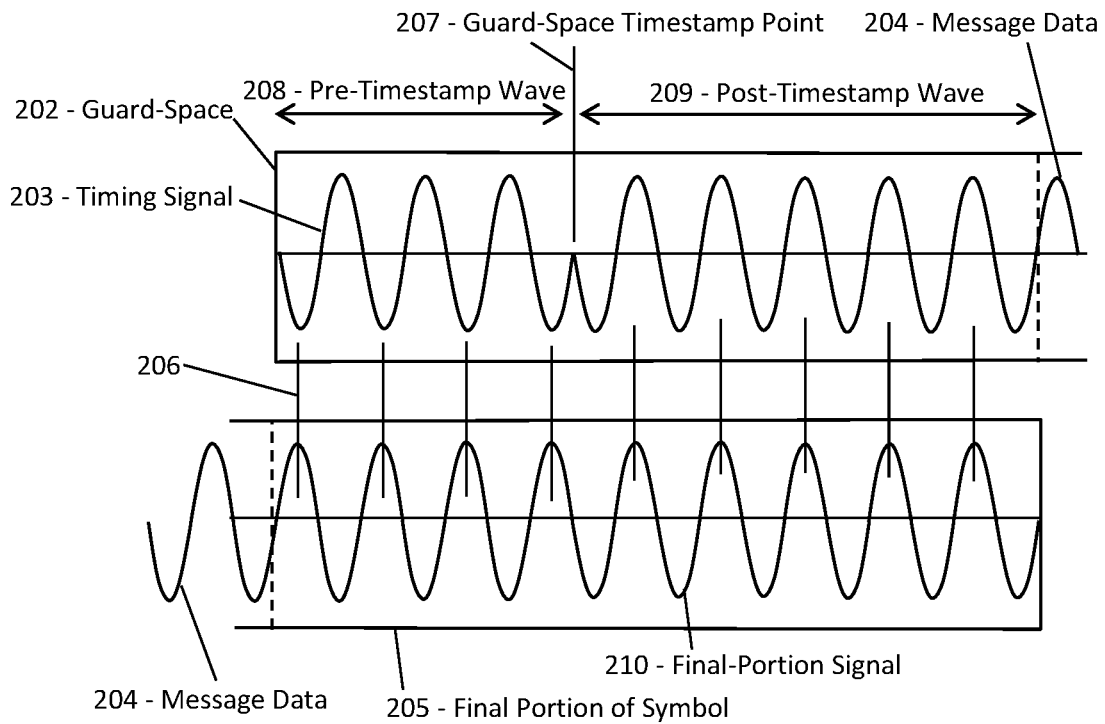
FIG. 2A is a schematic showing an exemplary embodiment of a guard-space timing signal containing a phase reversal, according to some embodiments.

FIG. 2A is a schematic showing an exemplary embodiment of a guard-space timing signal containing a phase reversal, according to some embodiments. As depicted in this non-limiting example, a guard-space 202 is shown expanded, such as the single-subcarrier guard-space 102 of FIG. 1A or the OFDM guard-space 122 of FIG. 1B, but greatly expanded. Also shown is the final portion 205 of the message data 204, containing a final-portion signal 210, greatly expanded. The guard-space 202 contains a timing signal 203, which is followed by message data 204, separated by a dashed line. The message data 204 is depicted as a simple sine wave for clarity, which may be realistic for the case of a single subcarrier signal as in FIG. 1A. For an OFDM symbol as in FIG. 1B, on the other hand, the composite signal is extremely complex due to the many subcarrier signals added together. The sine wave depiction will suffice to illustrate the methods.

In the example, the timing signal 203 includes a guard-space timestamp point 207 depicted as an abrupt reversal of phase of the timing signal 203. The timing signal 203 includes a pre-timestamp wave 208, and a post-timestamp wave 210. The post-timestamp wave 210 is a duplicate of the corresponding final-portion signal 210, but the pre-timestamp wave 208 is a phase-inverted copy of the corresponding final-portion signal 210. The timestamp point 207 is the interface between those two waves 208, 209 and is demarked by the abrupt phase reversal.

The receiver can determine the time of the timestamp point 207 by comparing the timing signal 203 to the final-portion signal 210, and can thereby determine the time at which the relative phase reverses. The timing signal 203 matches the corresponding final-portion signal 210 in the post-timestamp wave 209 after the timestamp point 207, but is opposite to the final-portion signal 210 in the pre-timestamp wave 208 before the timestamp point 207. This can be seen as the waveforms are initially crest-on-trough, and then suddenly change to crest-on-crest, as suggested by short marks 206.

The first half of the timing signal 203 is different from the first half of the final-portion signal 210, and therefore does not serve as a cyclic prefix. Nevertheless, the receiver may regard the second half of the timing signal 203 as a shortened cyclic prefix, since that part of the timing signal 203 is identical to the second half of the final-portion signal 210. The transmitter can configure the timing signal so that the second half of the timing signal 203 and the remaining message data 204 and the final-portion signal 210 are orthogonal to the adjacent subcarrier signals, thereby preserving the inter-subcarrier orthogonality. In addition, the transmitter can leave the adjacent subcarriers blank with no transmission, above and below the depicted resource element, so as to accommodate sidebands and an expanded bandwidth due to the modulation pattern of the timing signal 203.

The receiver can measure the time of the timestamp point 207 in various ways, as described in the next figure.

Figure 2B:
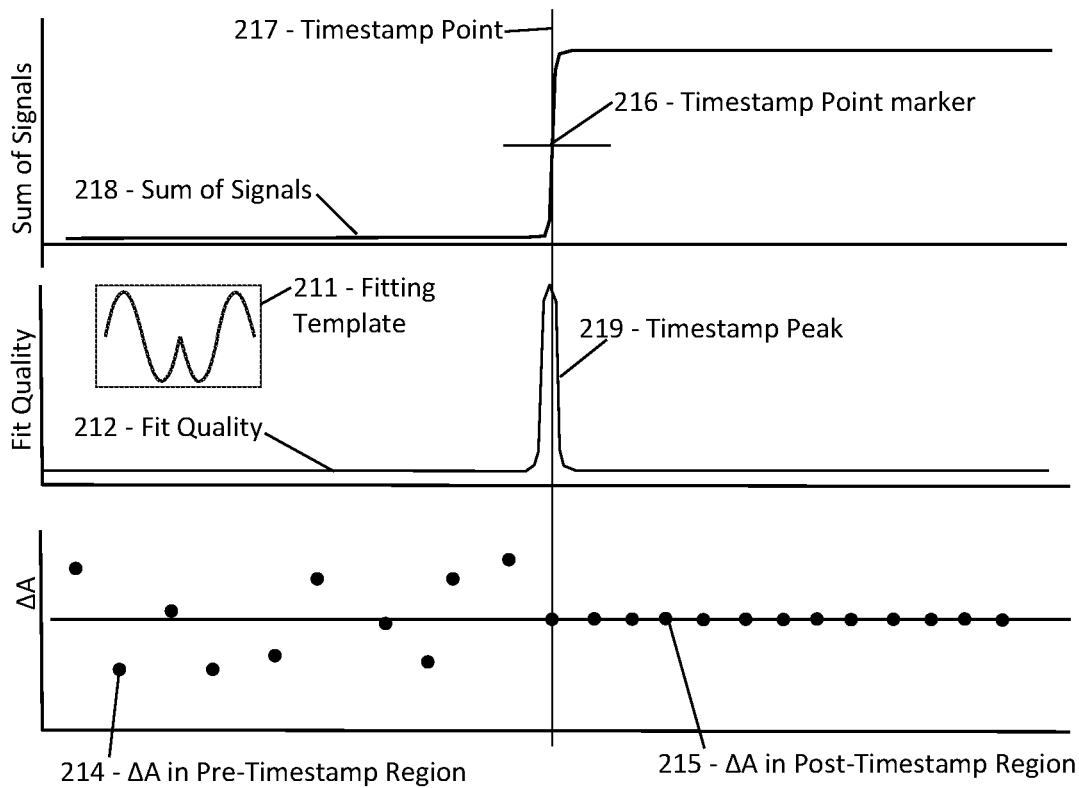
FIG. 2B is a schematic showing an exemplary embodiment of analysis procedures to localize a guard-space timestamp point, according to some embodiments.

FIG. 2B is a schematic showing an exemplary embodiment of analysis procedures to localize a guard-space timestamp point, according to some embodiments. As depicted in this non-limiting example, the first graph shows the sum 218 of the timing signal 203 plus the final-portion signal 210. For example, the receiver can digitize the timing signal 203 and the final-portion signal 210, and can add those two signals, thereby producing the sum of signals curve 218. The sum is nearly zero throughout the region to the left of the timestamp point 217, due to the phase inversion of the timing signal 203 there. At the timestamp point 217, the sum of signals 218 abruptly changes to a high value (twice the amplitude of the final-portion signal 210) and remains constant thereafter. The precise location of the timestamp point 217 is where the sum of signals 218 crosses a half-way value (equal to the amplitude of the final-portion signal 210), as suggested by a horizontal bar 216.

As an alternative analysis procedure, the receiver may calculate a fit quality using a "fitting template". The figure includes a fit quality graph 212 generated by positioning a fitting template 211 at various places on the timing signal 203 and calculating the overlap or quality of fit. The fitting template 211 includes the modulation pattern, or the expected shape, of the timing signal 203 near the timestamp point 217. The quality of fit 212 therefore exhibits a prominent timestamp peak 219 in the vicinity of the timestamp point 217, enabling a precise determination of the time of the timestamp point 217 relative to the symbol-time boundaries.

As a further alternative, in cases where the SNR is sufficient, the receiver can subtract the individual digitized amplitude measurements in the guard-space signal 202 from the corresponding measurements in the final-portion signal 205, the result being indicated as "AA". In the pre-timestamp wave 208, AA is widely scattered due to the opposite phases of the two added signals 203, 210, but in the post-timestamp wave 209, AA is zero since this region of the timing signal 203 is a copy of the corresponding region of the final-portion signal 210. Accordingly, the graph shows a widely scattered AA 214 in the pre-timestamp region 214, followed by a AA-0 in the post-timestamp region 215. The receiver can determine when AA abruptly changes from widely scattered to zero, which indicates the time of the timestamp point 217. This requires that the signal is strong enough for each individual amplitude data point to provide a reliable amplitude determination, but can provide maximal time resolution when needed.

There are many other signal processing and data analytic means for locating the timestamp point 207 in the timing signal 203, which are foreseen. The receiver can correct its clock setting and cancel clock drift by measuring the time of the timestamp point by any means relative to the resource grid of the receiver's clock.

FIG. 2C is a flowchart showing an exemplary embodiment of a procedure to synchronize a user device with a base station, according to some embodiments. As depicted in this non-limiting example, at 221 a base station transmits a subframe with a guard-space timestamp point in a particular OFDM symbol's guard-space, which in this case is the first OFDM symbol of the frame. The timestamp point is indicated by a detectable change in a timing signal in the OFDM symbol's guard-space. Generally, the timing signal is a cyclic prefix consisting of the message signal from a final portion of the OFDM symbol. In this case, the timestamp point is a modulation change in the timing signal, at the particular time of the timestamp point. The change may be an abrupt alteration of the phase or amplitude of the timing signal, or a switch between two orthogonal branch signals, or other user-detectable difference relative to the final-portion signal of the OFDM symbol.

At 222, the user device receives the frame and the OFDM symbol with the embedded timestamp point. Before interpreting the message data, the receiver may search for the timestamp point in the guard-space by comparing the guard-space timing signal with the message signal in the final-portion signal of the OFDM symbol. More generally, the timing signal differs from a normal cyclic prefix in some way that indicates the location of the timestamp point, and the receiver can find the timestamp point by recognizing that difference. For example, the receiver can subtract the final-portion signal from the timing signal in the guard-space, and thereby detect where the two signals differ. The timestamp point is the time of the interface between regions of equality and regions of non-equality of the two signals, in this case.

At 223, the user device can determine the timestamp point location in the guard-space region as, for example, an abrupt change in the modulation, or an abrupt change relative to the final portion of the message signal, or other recognizable change. The particular configuration of the timing signal, and the position (centered or otherwise in the guard-space)

of the timestamp point, may be determined by convention, or system information files, or an RRC or other downlink message, for example.

At 224, the user device can determine a timing error equal to a difference between the time of the timestamp point as-received and the expected time as-transmitted. For example, the transmitter may place the timestamp point in the center of the guard-space (as determined by the transmitter's time-base), and the receiver can measure the time of the timestamp point (according to the receiver's time-base). The receiver can then determine a time difference equal to a difference between the time of the timestamp point and the receiver's guard-space center, and can thereby reveal (and quantify) the time mismatch between the receiver and transmitter clock settings.

At 225, the user device can adjust its system clock according to the time difference, thereby bringing the user device into synchronization with the base station's time-base.

FIG. 2D is a flowchart showing an exemplary embodiment of an analysis procedure to correct a user device clock rate, according to some embodiments. As depicted in this non-limiting example, the timing signal is now transmitted in a single subcarrier instead of the OFDM symbol. Hence the receiver can extract the timing signal by separating the subcarrier signals.

At 231 a base station can transmit a series of guard-space timing resource elements containing guard-space timestamp points. The guard-space timing resource elements may be transmitted according to a synchronization schedule or periodicity, which may be indicated in a system information file such as an SSB message or an SIB1 message, or another message associated with a random access procedure, for example. Each guard-space timing resource element may be transmitted in the first symbol-time of each frame at the first subcarrier in the base station's resource grid, for example. At 232, a user device can receive two successive guard-space timing signals, determine the time of each guard-space timestamp points therein, and determine the length of the interval between timestamp points according to the user device's clock. At 233, the user device can compare the measured interval to the expected interval between timestamp points as indicated in the system information files, and at 234 determine a frequency offset between the base station's clock rate and the user device's clock rate. At 235, the user device can adjust its clock rate to negate the frequency offset.

If the user device is stationary, the user device's clock rate can be set equal to the base station's clock rate by this procedure, and the user device's uplink messages will arrive at the base station with the correct frequency for reception, according to some embodiments. However, if the user device is in motion, there is also a Doppler frequency shift. The Doppler shift generally changes much more slowly than oscillator fluctuations and therefore can be measured in advance. The user device can then correct its oscillator drift according to the measured frequency offset minus the predetermined Doppler frequency shift. The user device can also provide uplink messages to the base station by applying a reverse Doppler shift to each transmission, so that the predetermined Doppler shift will then bring the uplink message into agreement with the base station's subcarrier frequency, as desired.

The following figures show alternative configurations for the timestamp point waveform.

Figure 3A:
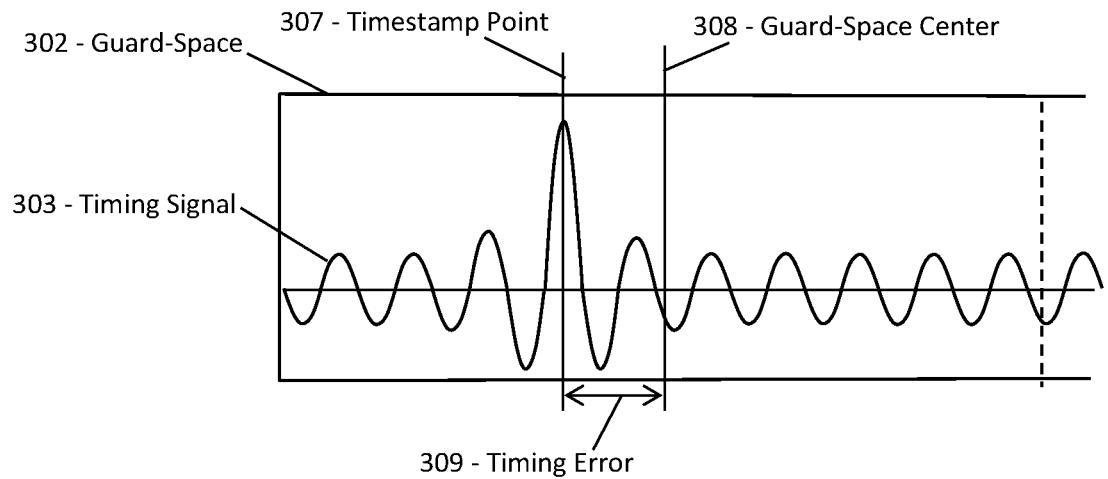
FIG. 3A is a schematic showing an exemplary embodiment of a guard-space timing signal with a large amplitude pulse, according to some embodiments.

FIG. 3A is a schematic showing an exemplary embodiment of a guard-space timing signal with a large amplitude pulse, according to some embodiments. As depicted in this non-limiting example, a guard-space 302 of an OFDM symbol includes a timing signal 303 consisting of a cyclic prefix equal to a final-portion signal at the end of the OFDM symbol, but modified by addition of a localized amplitude enhancement at a timestamp point 307. Thus the modulation pattern indicating the timestamp point 307 is the region of enhanced amplitude. The receiver can compare the timing signal 303 with the final-portion signal to identify the added amplitude enhancement, and can thereby localize the timestamp point 307. The receiver can then measure a timing error 309 between the timestamp point 307 and a fiducial point such as the center 308 of the guard-space 302. The timing error 309 indicates a disagreement with a time-base of a transmitter such as a base station, in which case the receiver can reset its own time-base or clock setting by adding or subtracting the timing error 309 to or from its (the receiver's) clock setting. Subsequent communications between the user and the base station can thereby arrange that uplink messages will arrive at the base station with the expected timing, synchronized with the base station's resource grid.

An advantage of the timing signal 303 as shown may be that it closely copies the duplication region of the OFDM symbol throughout most of the guard-space, except for a very narrow region of amplitude enhancement, and therefore the guard-space signal as shown may continue to serve as an adequate cyclic prefix. In the example, the timing signal 303 matches the final-portion signal at the end of the symbol-time, except for the short amplitude enhancement region. Hence the timing signal 303 may provide the isolation and orthogonality and range of propagation delays and other benefits that an undistorted cyclic prefix normally provides, notwithstanding the brief enhancement at the timestamp point 307.

Figure 3B:
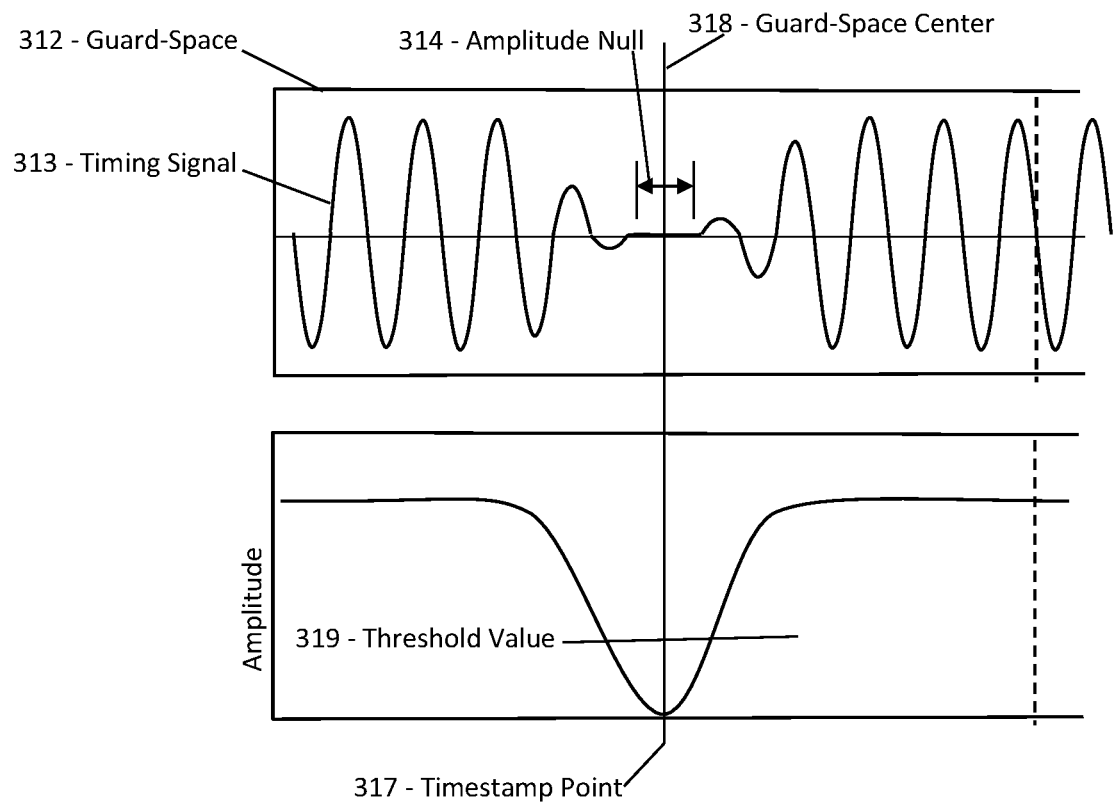
FIG. 3B is a schematic showing an exemplary embodiment of a guard-space timing signal with a brief amplitude null, according to some embodiments.

FIG. 3B is a schematic showing an exemplary embodiment of a guard-space timing signal with a brief amplitude null, according to some embodiments. As depicted in this non-limiting example, a guard-space 312 of an OFDM symbol contains a timing signal 313, which in this case is a uniform sine wave except for a brief amplitude null 314 at the guard-space center 318. A graph of the amplitude of the timing signal 313 is also shown, in which the minimum point represents the guard-space timestamp point 317. The receiver can measure the amplitude of the timing signal 313 and determine the time of the timestamp point 317 according to the amplitude null 314. Alternatively, the receiver can measure two times at which the amplitude (magnitude) crosses a threshold value 319 in the forward and backward directions, and can average the two times to locate the timestamp point 317. There are many other possible ways for the receiver to measure the time of the guard-space timestamp point 317 according to the amplitude null 314 in the timing signal 313.

Figure 3C:
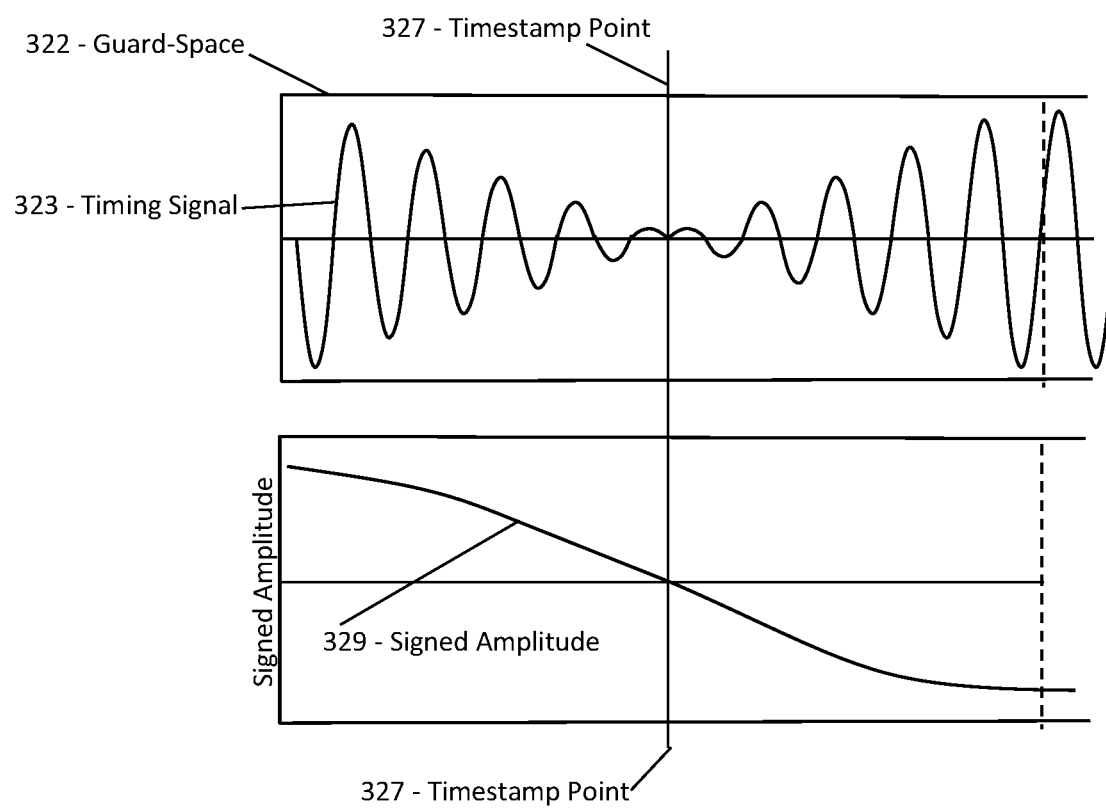
FIG. 3C is a schematic showing an exemplary embodiment of a guard-space timing signal with a ramp-shaped amplitude distribution, according to some embodiments.

FIG. 3C is a schematic showing an exemplary embodiment of a guard-space timing signal with a ramp-shaped amplitude distribution, according to some embodiments. As depicted in this non-limiting example, a guard-space 322 of a timing resource element contains a guard-space timing signal 323 configured as a ramp-shaped amplitude distribution, starting at a high amplitude (such as the maximum amplitude level of a modulation scheme), and then reducing linearly to zero amplitude at a timestamp point 327, and continuing back to the maximum amplitude again but with the opposite phase. The receiver can detect the timing signal 323, measure the amplitude and phase versus time in the guard-space 322, and determine a time corresponding to the minimum amplitude. The opposite-phase portion is equivalent to a negative-amplitude wave.

Also shown is a signed amplitude function 329 indicating the amplitude distribution in the guard-space 322, including the inverted phase portion plotted as a negative amplitude. The receiver can fit the signed amplitude function to the timing signal 323, such as a linear or slowly-varying function proportional to the signed amplitude of the timing signal 323. The receiver can then determine a zero-cross time at which the function passes through zero amplitude, and can thereby determine the time of the timestamp point 327. An advantage of fitting the ramp-shaped timing signal 323 to the signed amplitude function 329 may be that a large number of data points may contribute to the fitting, and hence the time of the zero-cross may be determined with greater precision than single-point-based methods, especially when the SNR is low. In contrast, other methods for measuring the time of the timestamp point, that rely on individual digitized waveform measurements, generally require high SNR.

Figure 4A:
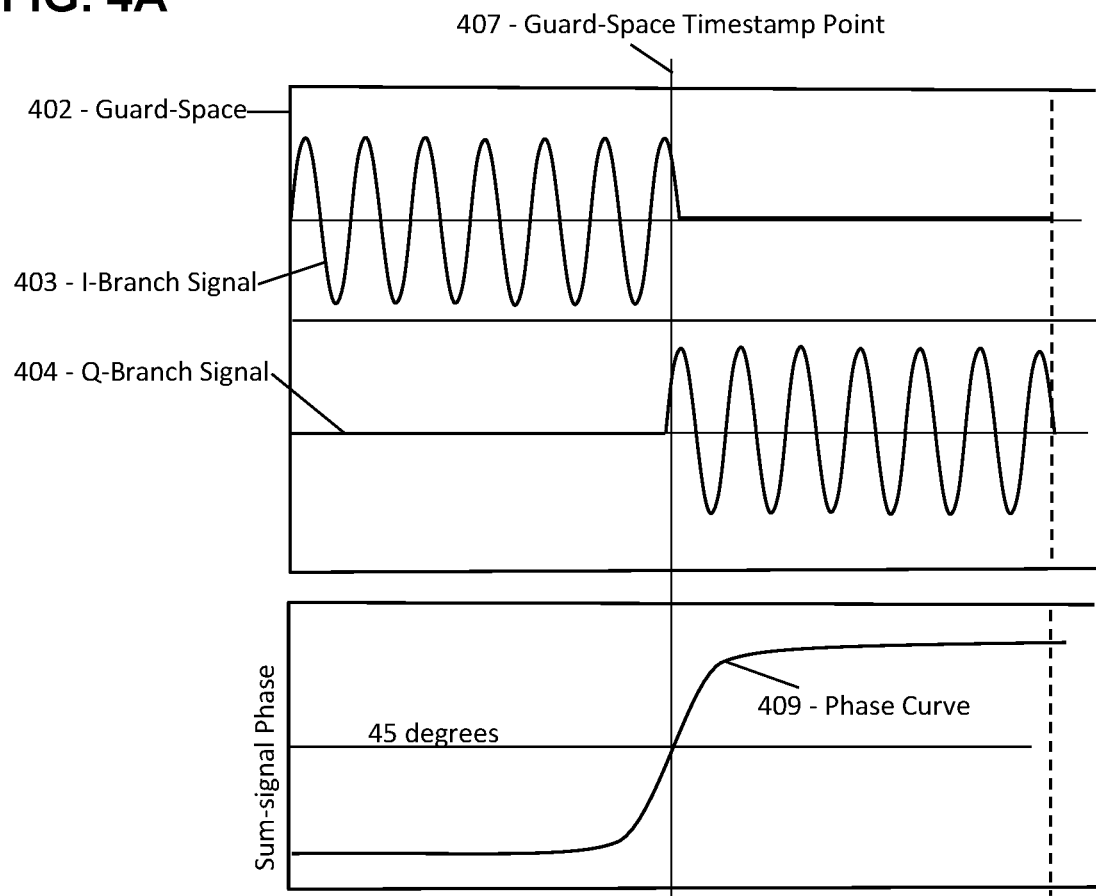
FIG. 4A is a schematic showing an exemplary embodiment of a timing signal containing a branch amplitude change, according to some embodiments.

FIG. 4A is a schematic showing an exemplary embodiment of a timing signal containing a branch amplitude change, according to some embodiments. As depicted in this non-limiting example, a guard-space 402 of a single resource element is configured as a pair of QAM branches, configured here as an I-branch signal 403 and an orthogonal (90-degree phase shifted) Q-branch signal 404, that together include a modulation pattern that defines a timestamp point 407. The I-branch signal 403 includes a first portion with a large sinusoidal signal, such as the maximum branch amplitude level of a modulation scheme as shown, followed after the timestamp point 407 by zero amplitude. The Q-branch signal 404 is initially zero, and then at the timestamp point 407 changes to the maximum branch amplitude. There is a very brief (¼ wavelength) overlap between the two non-zero regions, due to the 90-degree phase difference between the branches. A receiver can receive such a timing signal and separate the I and Q branches, then determine where the amplitude shifts from the I-branch signal 403 to the Q-branch signal 404, and thereby determine the time of the timestamp point 407.

Alternatively, the receiver can calculate a sum-signal phase equal to the arctangent of the amplitude ratio Q/I versus time. The resulting phase curve 409 is shown extending from zero degrees to 90 degrees and passing through 45 degrees at the timestamp point 407. The receiver can thereby determine the time of the timestamp point relative to the expected time.

The timing signals depicted in this case do not resemble the duplication region of an OFDM symbol because, among other things, QAM modulation does not normally include any zero-amplitude states. Hence the receiver may readily recognize the timing signal as such.

Figure 4B:
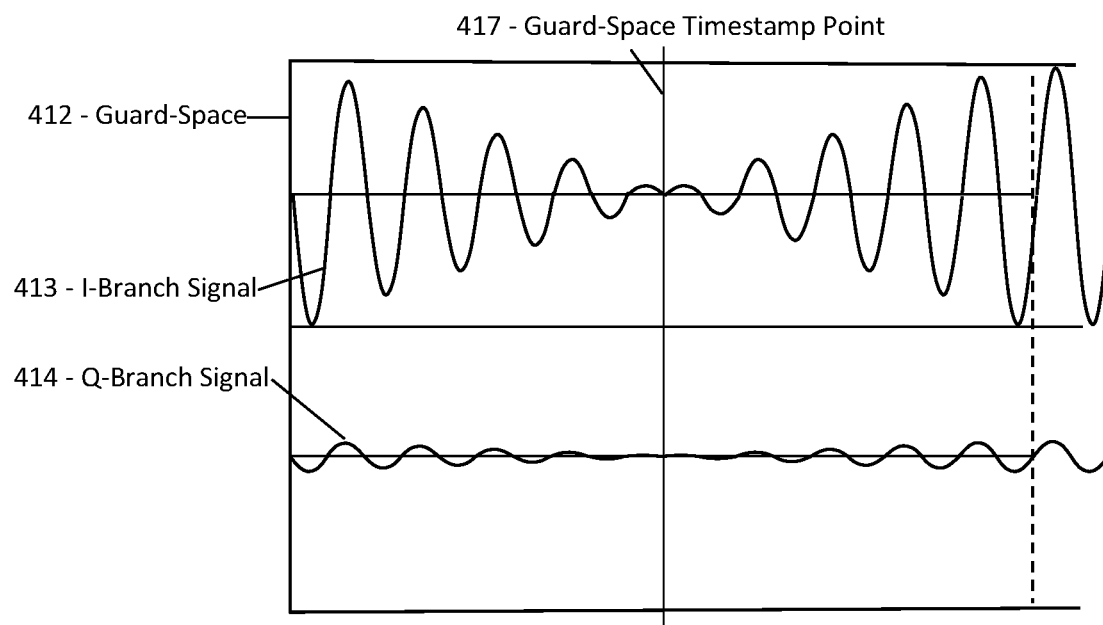
FIG. 4B is a schematic showing an exemplary embodiment of a timing signal containing a ramp-like amplitude change in one branch, according to some embodiments.

FIG. 4B is a schematic showing an exemplary embodiment of a timing signal containing a ramp-like amplitude change in one branch, according to some embodiments. As depicted in this non-limiting example, a guard-space 412 of a resource element includes an I-branch timing signal 413 and a Q-branch timing signal 414. The I-branch timing signal 413 is modulated, in amplitude and phase, by a transmitter, in a ramp-like fashion as described in FIG. 3C. The Q-branch has zero amplitude, as transmitted. The receiver can measure the amplitude of the I-branch signal 413 as-received and the Q-branch signal 414 as-received. The as-received Q-branch signal 414 may be non-zero due to phase noise, since phase noise typically rotates the I-branch signal 413 partially into the Q-branch signal 414. Amplitude noise can increase or decrease the amplitudes of the I-branch and Q-branch timing signals 413, 414 depending on the phase of the noise relative to the signal.

The receiver can determine the time of a timestamp point 417, correct for phase noise, and correct for amplitude noise based on the as-received branch signals. For example, the receiver can digitize the I-branch signal 413 and the Q-branch signal 414, and can calculate a sum-signal amplitude equal to a square root of a sum of the squares of the I and Q branch amplitudes, and can fit a function such as a signed amplitude function (not shown here) to the signed sum-signal amplitude, and can thereby determine the time of the timestamp point 417 as the time at which the signed amplitude function passes through zero.

In addition, the receiver can compare the maximum amplitude value of the sum-signal amplitude to an expected amplitude level. The expected amplitude level may be exhibited in a demodulation reference, for example. Alternatively, the receiver can determine the maximum amplitude level according to the fitted amplitude function, and can compare that to the expected value. In either case, any difference between the measured amplitude and the expected amplitude likely indicates amplitude noise. The receiver can then add or subtract the difference to the message elements of a message, depending on the relative phase, and can thereby mitigate amplitude noise, according to some embodiments.

In addition, the receiver can calculate a phase rotation angle, due to phase noise, as the arctangent of the Q-branch amplitude divided by the I-branch amplitude, for example, and can mitigate phase noise in the message elements at the same symbol-time by de-rotating their I and Q branch amplitudes by the phase rotation angle.

Thus the receiver, by analyzing the I and Q timing signals as described, can determine the time of a timestamp point in the guard-space, measure amplitude noise, and measure phase noise, without consuming even a single resource element (since the timestamp point is in the guard-space), and without exchanging unnecessary messages of the prior art, according to some embodiments.

Figure 4C:
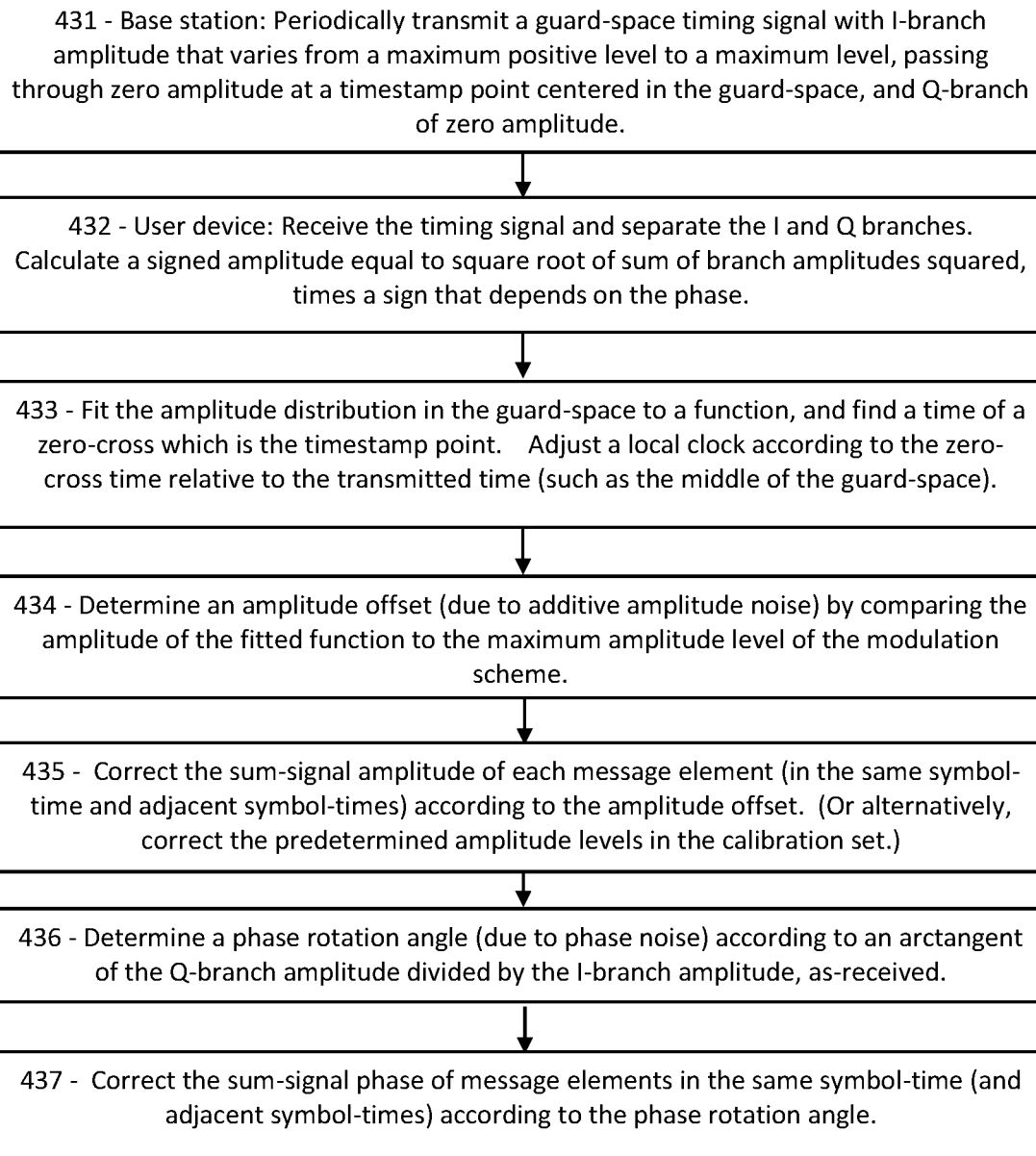
FIG. 4C is a flowchart showing an exemplary embodiment of an analysis procedure to correct a user device clock time and mitigate noise, according to some embodiments.

FIG. 4C is a flowchart showing an exemplary embodiment of an analysis procedure to correct a user device clock time and mitigate noise, according to some embodiments. As depicted in this non-limiting example, at 431 a base station can periodically transmit a guard-space timing signal in the guard-space of a particular message element, configured as a pair of QAM branch signals such as an I-branch and an orthogonal Q-branch. In this example, the I-branch is modulated as a ramp-like amplitude distribution changing linearly from the maximum branch amplitude (or the maximum sum-signal amplitude) of the QAM modulation scheme, down to zero amplitude at a timestamp point, and then continuing back to the maximum amplitude but with the opposite phase. The Q-branch has zero amplitude, as-transmitted.

At 432, a user device can receive the guard-space signals, separate the I and Q branch signals, and determine the amplitude distribution of those signals as-received. In this case, the receiver calculates a sum-signal amplitude equal to the square root of the sum of the squares of the two branch signals, selecting the positive square root when the I-branch signal has a first phase, and selecting the negative square root when the I-branch signal has the first phase plus 180 degrees.

At 433, the receiver can fit a ramp-like function such as a signed amplitude function to the sum-signal distribution, and can thereby determine the time of the timestamp point as the time at which the fitted function passes through zero.

Then, after comparing the time of the timestamp point to an expected time (such as the center of the guard-space), the receiver can adjust its local clock reading to agree with the base station.

At 434, the receiver can also mitigate additive amplitude noise by comparing the amplitude of the sum-signal in the guard-space to the expected amplitude, as indicated by a previous demodulation reference for example, and can thereby determine an amplitude and phase of the amplitude noise. The receiver can then correct the various message elements proximate to the timing resource element by adding or subtracting (depending on the relative phase) the noise amplitude to/from each message element at 435.

The receiver can also correct phase noise. At 436, the receiver can determine a phase rotation angle according to a ratio of the Q and I branch amplitudes as-received, and can then at 437 correct subsequent message elements by de-rotating their sum-signals by that phase rotation angle. Thus the receiver has adjusted its clock setting, mitigated amplitude noise, and mitigated phase noise, all based on the timing signals received in a single guard-space.

Figure 5A:
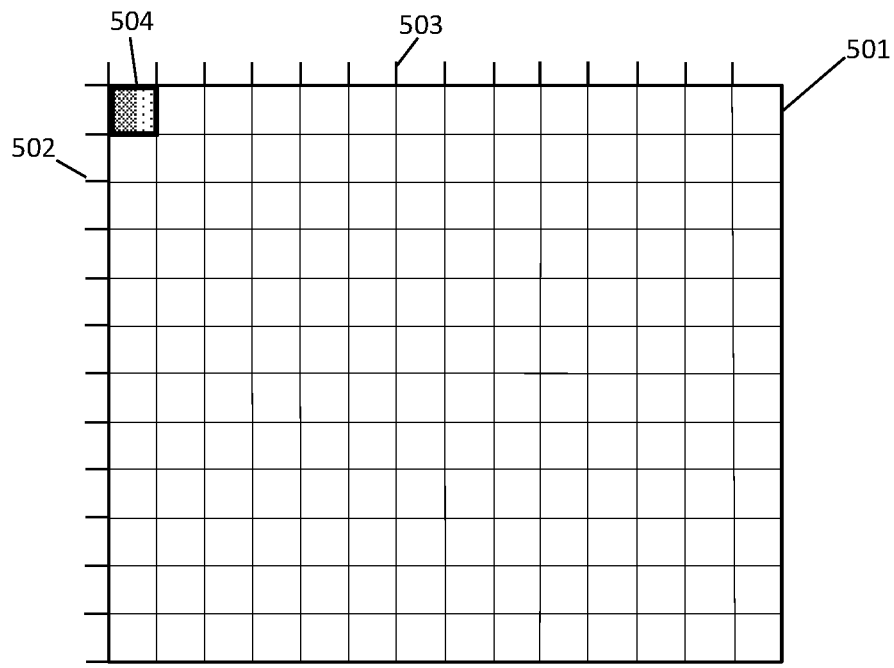
FIG. 5A is a schematic showing an exemplary embodiment of a resource grid containing a guard-space timestamp point, according to some embodiments.

FIG. 5A is a schematic showing an exemplary embodiment of a resource grid containing a guard-space timestamp point, according to some embodiments. As depicted in this non-limiting example, the resource grid 501 is a single slot with 14 symbol-times 503 and 12 subcarriers 502. A particular resource element 504 (heavy outline) includes a guard-space (dark stipple) followed by a message data portion (light stipple). The guard-space includes a timing signal (not shown) by which a receiver can measure a timing error relative to a base station's clock, and can thereby set its own clock for synchronization.

Figure 5B:
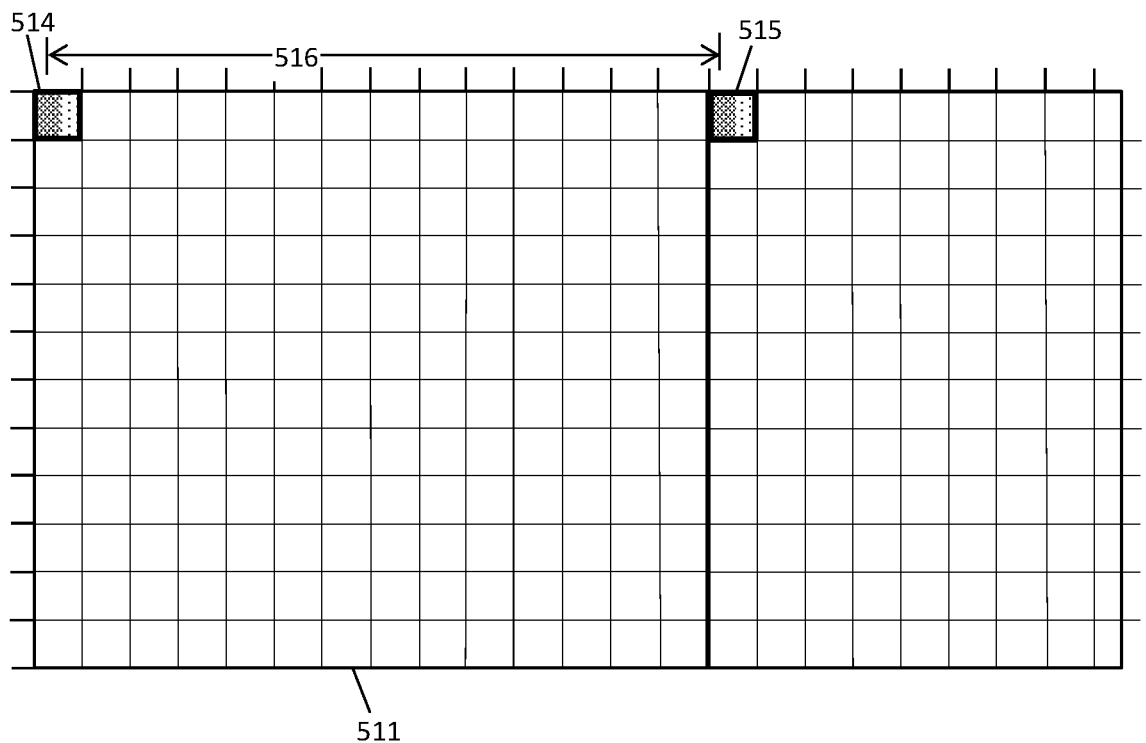
FIG. 5B is a schematic showing an exemplary embodiment of a resource grid containing two guard-space timestamp points, according to some embodiments.

FIG. 5B is a schematic showing an exemplary embodiment of a resource grid containing two guard-space timestamp points, according to some embodiments. As depicted in this non-limiting example, a slot 511 and part of a second slot are shown sequential in time. Two resource elements 514, 515 include guard-space regions (dark stipple) which include timing signals that determine a timestamp point. The receiver can measure a time interval 516 between the two timestamp points in the two resource elements 514, 515 according to the receiver's clock, and can compare the measured value to a predetermined standard time interval (such as one subframe width), and thereby determine a clock rate error relative to the clock rate of the base station. The receiver can then adjust its (the receiver's) clock rate to correct the clock rate error.

Figure 5C:
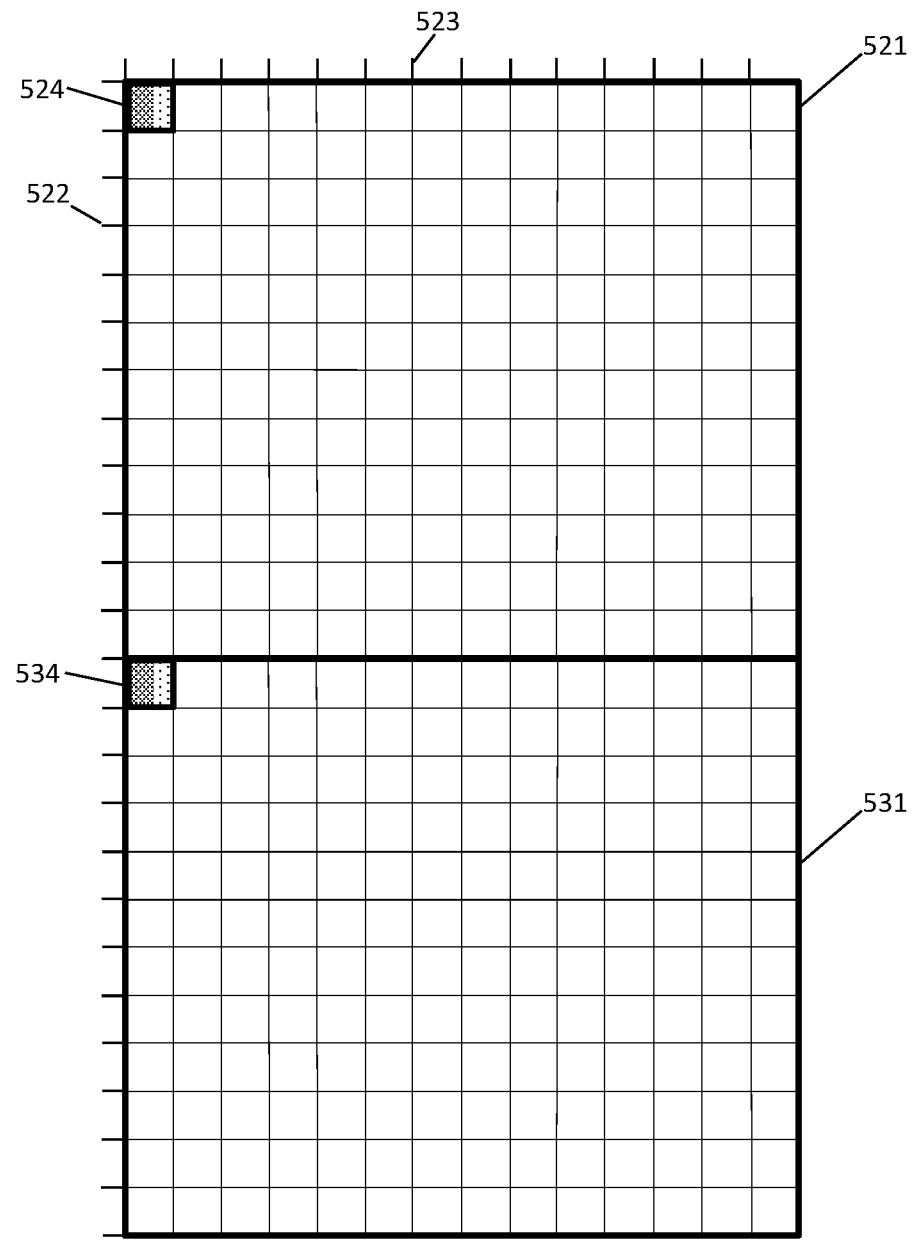
FIG. 5C is a schematic showing an exemplary embodiment of a resource grid containing two guard-space timestamp points in the same symbol-time, according to some embodiments.

FIG. 5C is a schematic showing an exemplary embodiment of a resource grid containing two guard-space timestamp points in the same symbol-time, according to some embodiments. As depicted in this non-limiting example, a first slot 521 and a second slot 531 occupy the same symbol-times 523 in sequential subcarriers 522. Each slot 521, 531 includes one resource element 524, 534 that includes a guard-space (dark stipple) containing a timing signal that defines a timestamp point. The receiver can measure the times of the two timestamp points, as discussed elsewhere herein, and can average, or otherwise combine, those two timestamp points to obtain improved accuracy in determining the clock time of the transmitter despite noise and limited signal strength.

The examples have shown how a guard-space timestamp point can enable a receiver to update its clock time without significantly impacting communications, and without transmitting or receiving any messages (other than the guard-space timestamp point), and without costing significant transmission power. In some cases, however, the receiver's clock drift is an indication of a frequency drift or a Doppler shift, instead of a random fluctuation in timing. In that case, the receiver may need to adjust its clock rate as well as the clock setting, to agree with the base station's clock. The base station may assist the user devices in maintaining "syntonized" clock rates by transmitting two (or more) spaced-apart guard-space timestamp points in, for example, subsequent frames or subframes. The user device can detect one of the guard-space timestamp points and correct its clock time according to a first difference, equal to a difference between the first timestamp position as-received and the middle of the first guard-space as determined by the receiver's clock. The receiver can then detect a second timestamp point using the corrected clock setting, and can measure the time location of the second timestamp point, and determine a second difference equal to a difference between the second timestamp point and the middle of the second guard-space. This second difference may indicate a clock rate error since the clock time was adjusted according to the first timestamp point. Therefore, the receiver may update its clock time again according to the second difference, and may also adjust its clock rate according to the time interval between the timestamp points.

As an alternative, the receiver can measure an interval between the first and second timestamp points, and compare that interval to a predetermined value, thereby correcting the clock rate according to a difference.

As yet another alternative, the receiver can measure the first and second timestamp points without adjusting its clock, and then finally adjust both the frequency and time setting after the second timestamp point. By either method, or other equivalent method, the receiver can use two timestamp points to adjust both the local clock setting and clock rate of the receiver to comply with the base station, without the unnecessary messaging of prior-art synchronization procedures, and without interrupting concurrent communications in the associated message data, according to some embodiments.

In these examples, the base station has transmitted no messages related to synchronization, other than the very brief modification of a single resource element guard-space or a single OFDM symbol guard-space, to demark the timestamp point. Likewise, the user device has transmitted no messages to the base station. By following a predetermined synchronization schedule of timestamp points, the user device has corrected its clock time and clock frequency to comply with the base station, and in some embodiments has mitigated amplitude noise and phase noise, all at zero cost in resources and without impeding the regular communication traffic since the timing signals are provided only in the guard-space regions. Such an ultra-lean, non-interfering synchronization/syntonization procedure may enable user devices to maintain quality communications with the base station by periodically correcting oscillator drift, and may thereby provide enhanced reliability of communications.

Due to the many options and variations disclosed herein, and other versions derived therefrom by artisans after reading this disclosure, it would be helpful for a wireless standards committee to establish conventions governing formats and implementation options for providing guard-space timestamp points and ultra-lean procedures for precision synchronization, as disclosed. Such beneficial timing and frequency alignment procedures may enable users to communicate in 5G and 6G multi-GHz bands with increased reliability, while avoiding unnecessary signaling and delays.

The wireless embodiments of this disclosure may be aptly suited for cloud backup protection, according to some embodiments. Furthermore, the cloud backup can be provided cyber-security, such as blockchain, to lock or protect data, thereby preventing malevolent actors from making changes. The cyber-security may thereby avoid changes that, in some applications, could result in hazards including lethal hazards, such as in applications related to traffic safety, electric grid management, law enforcement, or national security.

In some embodiments, non-transitory computer-readable media may include instructions that, when executed by a computing environment, cause a method to be performed, the method according to the principles disclosed herein. In some embodiments, the instructions (such as software or firmware) may be upgradable or updatable, to provide additional capabilities and/or to fix errors and/or to remove security vulnerabilities, among many other reasons for updating software. In some embodiments, the updates may be provided monthly, quarterly, annually, every 2 or 3 or 4 years, or upon other interval, or at the convenience of the owner, for example. In some embodiments, the updates (especially updates providing added capabilities) may be provided on a fee basis. The intent of the updates may be to cause the updated software to perform better than previously, and to thereby provide additional user satisfaction.

The systems and methods may be fully implemented in any number of computing devices. Typically, instructions are laid out on computer readable media, generally non-transitory, and these instructions are sufficient to allow a processor in the computing device to implement the method of the invention. The computer readable medium may be a hard drive or solid state storage having instructions that, when run, or sooner, are loaded into random access memory. Inputs to the application, e.g., from the plurality of users or from any one user, may be by any number of appropriate computer input devices. For example, users may employ vehicular controls, as well as a keyboard, mouse, touch-screen, joystick, trackpad, other pointing device, or any other such computer input device to input data relevant to the calculations. Data may also be input by way of one or more sensors on the robot, an inserted memory chip, hard drive, flash drives, flash memory, optical media, magnetic media, or any other type of file-storing medium. The outputs may be delivered to a user by way of signals transmitted to robot steering and throttle controls, a video graphics card or integrated graphics chipset coupled to a display that maybe seen by a user. Given this teaching, any number of other tangible outputs will also be understood to be contemplated by the invention. For example, outputs may be stored on a memory chip, hard drive, flash drives, flash memory, optical media, magnetic media, or any other type of output. It should also be noted that the invention may be implemented on any number of different types of computing devices, e.g., embedded systems and processors, personal computers, laptop computers, notebook computers, net book computers, handheld computers, personal digital assistants, mobile phones, smart phones, tablet computers, and also on devices specifically designed for these purpose. In one implementation, a user of a smart phone or Wi-Fi-connected device downloads a copy of the application to their device from a server using a wireless Internet connection. An appropriate authentication procedure and secure transaction process may provide for payment to be made to the seller. The application may download over the mobile connection, or over the Wi-Fi or other wireless network connection. The application may then be run by the user. Such a networked system may provide a suitable computing environment for an implementation in which a plurality of users provide separate inputs to the system and method.

It is to be understood that the foregoing description is not a definition of the invention but is a description of one or more preferred exemplary embodiments of the invention. The invention is not limited to the particular embodiments(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater, or different steps than that shown here. All such other embodiments, changes, and modifications are intended to come within the scope of the appended claims.

As used in this specification and claims, the terms "for example", "e.g.", "for instance", "such as", and "like" and the terms "comprising", "having", "including", and their other verb forms, when used in conjunction with a listing of one or more components or other items, are each to be construed as open-ended, meaning that the listing is not to be considered as excluding other additional components or items. Other terms are to be construed using their broadest reasonable meaning unless they are used in a context that requires a different interpretation.

The invention claimed is:

1. A method for a base station of a wireless network to provide synchronization signals, the method comprising:
a) transmitting a signal occupying a single symbol-time of a resource grid, the signal comprising a first guard-space portion followed by a second guard-space portion followed by a message portion;
b) wherein the message portion comprises a final region at an ending of the symbol-time, and a pre-final region immediately preceding the final region;
c) wherein the second guard-space portion is a copy of the signal in a final region of the message portion; and
d) wherein the first guard-space portion comprises a phase-shifted copy of the signal in the pre-final region of the message portion.

2. The method of claim 1, wherein the message portion is transmitted according to 5G or 6G technology.

3. The method of claim 1, wherein the phase-shifted copy of the signal in the pre-final region is phase-shifted by a multiple of 90 degrees relative to the signal in the pre-final region.

4. The method of claim 1, wherein:
a) the signal occupies a particular subcarrier and a particular symbol-time of the resource grid during downlink-scheduled symbol-times; and
b) the particular subcarrier and the particular symbol-time are specified in a system information message.

5. The method of claim 4, wherein:
a) the particular subcarrier is adjacent to a first subcarrier at a higher frequency and a second subcarrier at a lower frequency; and
b) zero power is transmitted, during the single symbol-time, in the first subcarrier and in the second subcarrier.

6. The method of claim 1, wherein the signal comprises an OFDM (orthogonal frequency-division multiplexing) symbol comprising a sum of multiple subcarrier signals.

7. The method of claim 1, wherein a duration of the first guard-space portion is equal to a duration of the second guard-space portion.

8. The method of claim 1, further comprising:
 a) constructing a reconstructed cyclic prefix by inverting a phase of the first guard-space portion and appending the second guard-space portion; and
 b) performing signal processing on a signal comprising the reconstructed cyclic prefix concatenated with the message portion.

9. A method for a user device of a wireless network to receive synchronization signals, the method comprising:
 a) receiving a signal occupying a single symbol-time of a resource grid, the signal comprising a first guard-space portion followed by a second guard-space portion followed by a message portion;
 b) wherein the message portion comprises a final region at an ending of the symbol-time, and a pre-final region immediately preceding the final region;
 c) comparing the signal in the second guard-space portion to the signal in the final region of the message portion;
 d) comparing the signal in the first guard-space portion to the signal in the pre-final region, phase-shifted according to a predetermined phase shift;
 e) determining, according to the comparing, a timestamp time corresponding to a boundary between the first guard-space portion and the second guard-space portion; and
 f) adjusting a clock setting of the user device, according to the timestamp time, to bring the clock of the user device into agreement with a clock of a base station of the wireless network.

10. The method of claim 9, wherein the predetermined phase shift is a non-zero multiple of 90 degrees.

11. The method of claim 9, wherein the signal occupies a single subcarrier and a single symbol-time of the resource grid, the subcarrier and symbol-time specified by a system information message.

12. The method of claim 9, wherein the signal comprises an OFDM (orthogonal frequency-division multiplexing) symbol comprising a sum of multiple subcarrier signals.

13. The method of claim 9, further comprising:
 a) calculating an error comprising:
  i) a difference between the signal in the first guard-space portion and the signal in the pre-final region of the message portion phase-shifted according to the predetermined phase shift; plus
  ii) a difference between the signal in the second guard-space portion and the signal in the final region of the message portion;
 b) varying a time of a boundary between the first guard-space portion and the second guard-space portion; and
 c) determining, according to the varying, a particular time of the boundary at which the error is minimized.

14. The method of claim 9, wherein the adjusting the clock setting of the user device comprises:
 a) determining a time error comprising a magnitude of a difference between the timestamp time and a midpoint of the guard-space;
 b) when the timestamp time occurs earlier than the midpoint of the guard-space, adding the time error to the clock setting of the user device; and
 c) when the timestamp time occurs later than the midpoint of the guard-space, subtracting the time error from the clock setting of the user device.

15. A method for a user device, of a wireless network comprising a base station, to adjust a clock frequency, the method comprising:
 a) periodically receiving a guard-space timestamp point comprising a 180 degree phase reversal of a signal in a guard-space of a predetermined resource element;
 b) upon receiving each timestamp point, determining a timing correction according to a time difference comprising a time of the timestamp point minus a time of a midpoint of the guard-space, and applying a time correction to a clock of the user device according to the time difference;
 c) after receiving at least integer N timestamp points, determining an average of N time differences;
 d) calculating a frequency offset comprising the average of N time differences, times a frequency of the clock of the user device, divided by an interval between the timestamp points; and
 e) adjusting the frequency of the clock of the user device according to the frequency offset.

16. The method of claim 15, wherein:
 a) the interval between the timestamp points comprises an integer M of subframes; and
 b) the integer M is specified by the base station in a system information message.

17. The method of claim 15, further comprising:
 a) when the average of N time differences is positive, reducing the frequency of the clock of the user device by the frequency offset; and
 b) when the average of N time differences is negative, increasing the frequency of the clock of the user device by the frequency offset.

18. The method of claim 15, further comprising, when a magnitude of the average of N time differences is below a predetermined threshold, declining to adjust the frequency of the clock of the user device.

19. The method of claim 15, further comprising:
 a) determining that the user device is in motion; and
 b) transmitting a request message to the base station, requesting that the interval between the timestamp points be reduced.

20. The method of claim 15, further comprising:
 a) determining that the clock of the user device has a rate of drift above a predetermined threshold; and
 b) transmitting a request message to the base station, requesting that the interval between the timestamp points be reduced.

* * * * *